US012647882B2

(12) United States Patent
Hu et al.

(10) Patent No.: US 12,647,882 B2
(45) Date of Patent: Jun. 2, 2026

(54) ELECTION OF A NETWORK DEVICE TO SEND DATA OF AN ELECTRONIC DEVICE

(71) Applicant: HEWLETT PACKARD ENTERPRISE DEVELOPMENT LP, Spring, TX (US)

(72) Inventors: Yaohua Hu, Beijing (CN); Guo Xiao, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 353 days.

(21) Appl. No.: 18/393,065

(22) Filed: Dec. 21, 2023

(65) Prior Publication Data

US 2025/0212108 A1    Jun. 26, 2025

(51) Int. Cl.
*H04W 48/20*        (2009.01)
*H04W 4/80*         (2018.01)
*H04W 48/16*        (2009.01)

(52) U.S. Cl.
CPC ............. *H04W 48/20* (2013.01); *H04W 4/80* (2018.02); *H04W 48/16* (2013.01)

(58) Field of Classification Search
CPC ...... H04W 48/20; H04W 48/80; H04W 48/16
See application file for complete search history.

(56) References Cited

U.S. PATENT DOCUMENTS 7,509,139 B2    3/2009  Yamasaki et al.
9,081,643 B2    7/2015  Wang et al.

11,653,417 B2    5/2023  Pei et al.
11,683,774 B2    6/2023  Oteri et al.
2023/0016602 A1*  1/2023  Vuggrala .............. H04L 9/3247

FOREIGN PATENT DOCUMENTS

WO      2005/006781 A2    1/2005
WO      2015/167321 A1    11/2015

OTHER PUBLICATIONS

Wikipedia, "Bluetooth Low Energy", available online at <https://en.wikipedia.org/w/index.php?title=Bluetooth_Low_Energy&oldid=1085186534>, Apr. 28, 2022, 15 pages.

(Continued)

*Primary Examiner* — Myron Wyche
(74) *Attorney, Agent, or Firm* — Trop, Pruner & Hu, P.C.

(57)                ABSTRACT

In some examples, a first network device includes a communication interface to associate with electronic devices, and a wireless interface to wirelessly receive data from an electronic device over a wireless link distinct from any communication link to the communication interface. The first network device determines first election information relating to a wireless communication through the wireless interface between the electronic device and the first network device, and receives, at the first network device over a network from a second network device, second election information relating to a wireless communication between the electronic device and the second network device. Based on the first election information and the second election information, first network device performs an election process that determines whether the first network device is elected, from among a plurality of network devices, to send the data received through the wireless interface to a target entity.

20 Claims, 5 Drawing Sheets

(56)  References Cited

OTHER PUBLICATIONS

Wikipedia, "Internet of things", available online at <https://en.wikipedia.org/w/index.php?title=Internet_of_things&oldid=1076733095>, Mar. 12, 2022, 48 pages.

Hu et al., U.S. Appl. No. 18/393,065, entitled "Election of a Network Device To Send Data of an Electronic Device", filed Dec. 21, 2023, 37 pages.

Wikipedia, "BitTorrent," Aug. 15, 2024, <https://en.wikipedia.org/w/index.php?title=BitTorrent&oldid=1240463264>, 23 pages.

* cited by examiner

400

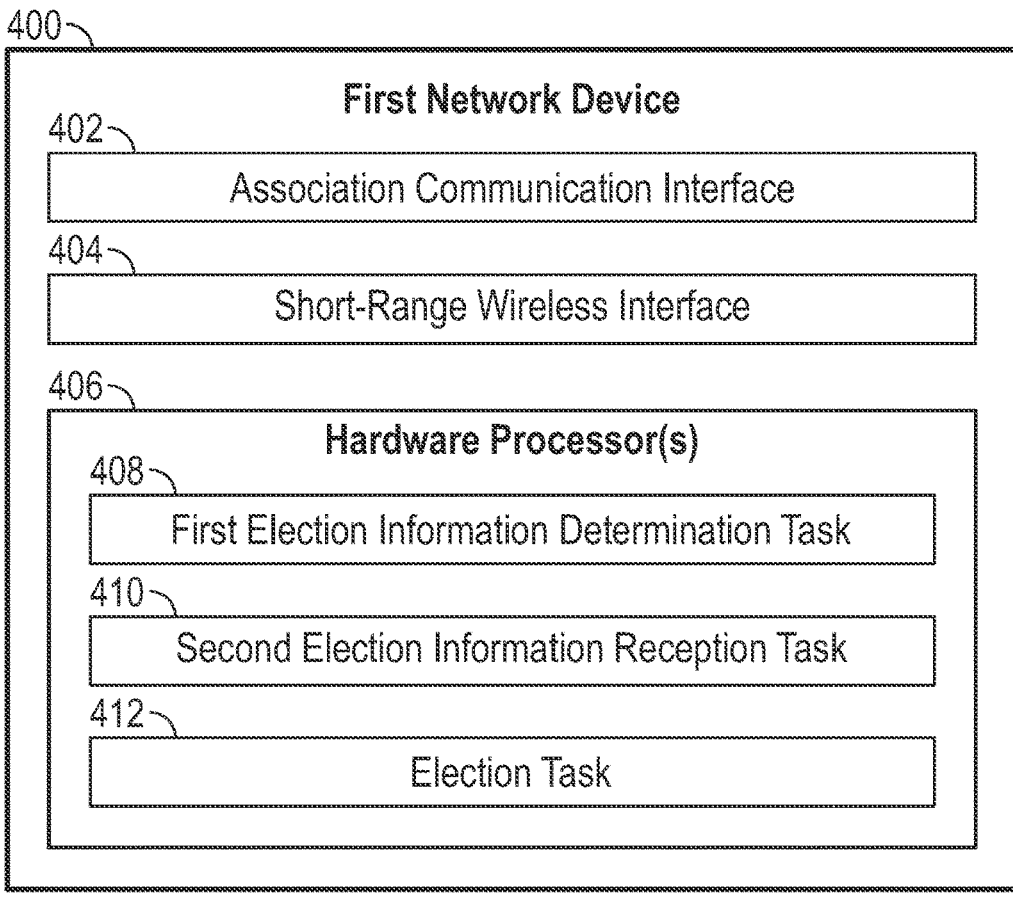

First Network Device

402

Association Communication Interface

404

Short-Range Wireless Interface

406

Hardware Processor(s)

408

First Election Information Determination Task

410

Second Election Information Reception Task

412

Election Task

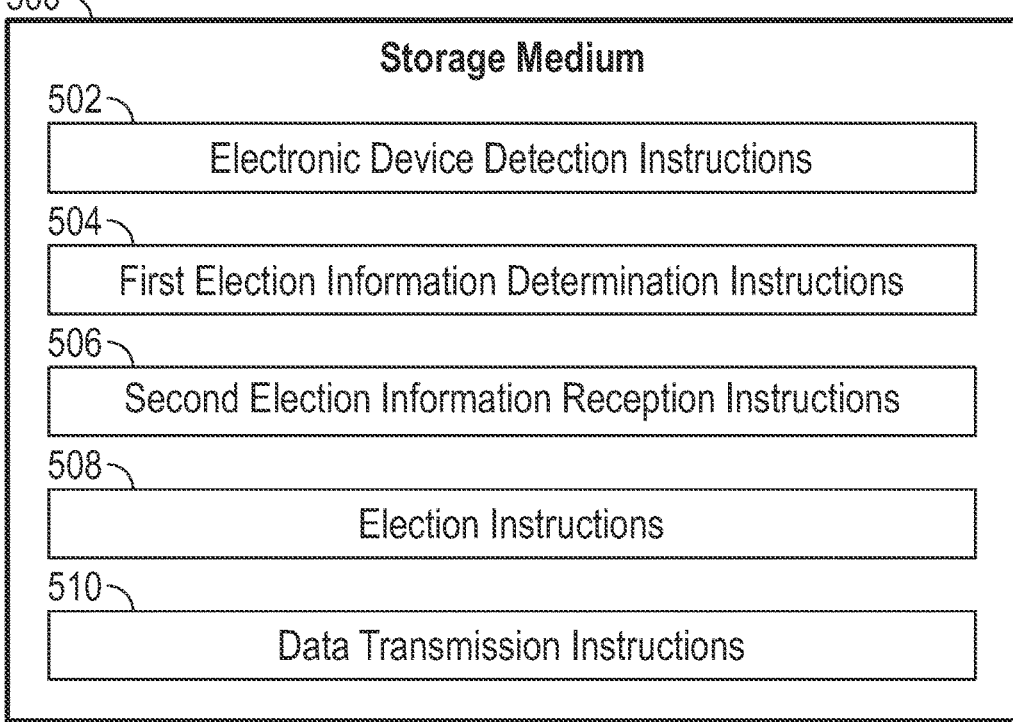

Storage Medium

502

Electronic Device Detection Instructions

504

First Election Information Determination Instructions

506

Second Election Information Reception Instructions

508

Election Instructions

510

Data Transmission Instructions

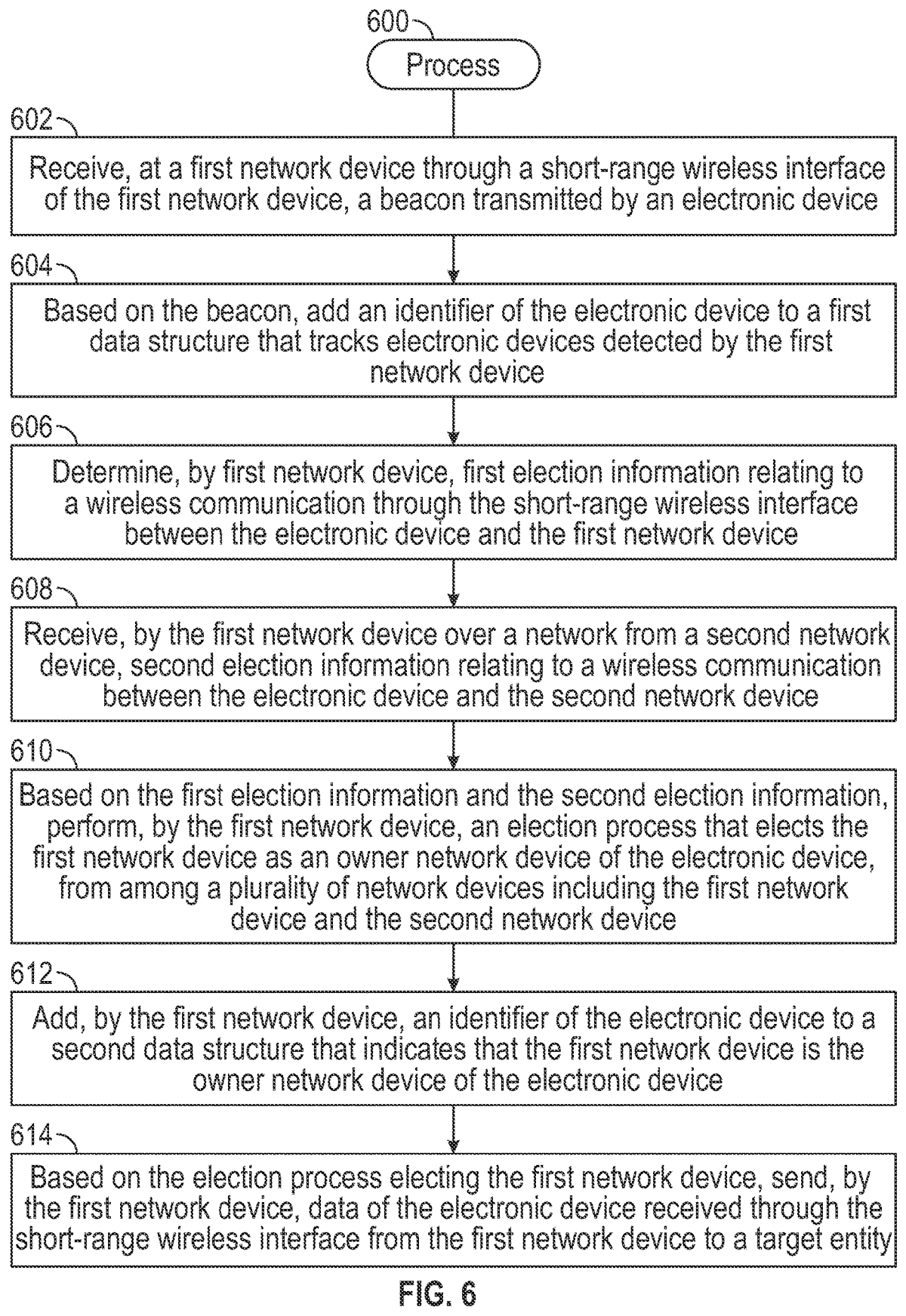

Process

602

Receive, at a first network device through a short-range wireless interface of the first network device, a beacon transmitted by an electronic device

604

Based on the beacon, add an identifier of the electronic device to a first data structure that tracks electronic devices detected by the first network device

606

Determine, by first network device, first election information relating to a wireless communication through the short-range wireless interface between the electronic device and the first network device

608

Receive, by the first network device over a network from a second network device, second election information relating to a wireless communication between the electronic device and the second network device

610

Based on the first election information and the second election information, perform, by the first network device, an election process that elects the first network device as an owner network device of the electronic device, from among a plurality of network devices including the first network device and the second network device

612

Add, by the first network device, an identifier of the electronic device to a second data structure that indicates that the first network device is the owner network device of the electronic device

614

Based on the election process electing the first network device, send, by the first network device, data of the electronic device received through the short-range wireless interface from the first network device to a target entity

FIG. 6

ELECTION OF A NETWORK DEVICE TO SEND DATA OF AN ELECTRONIC DEVICE

BACKGROUND

Electronic devices can include dedicated functionality devices that perform respective dedicated functions. Examples of dedicated functionality devices can include any or some of the following: sensors, cameras, thermostats, light fixtures, security devices, home appliances, or other types of devices. In some examples, dedicated functionality devices include Internet of Things (IoT) devices that are able to transmit data over a public network such as the Internet.

BRIEF DESCRIPTION OF THE DRAWINGS

Some implementations of the present disclosure are described with respect to the following figures.

FIG. 4 is a block diagram of a network device according to some examples.

FIG. 5 is a block diagram of a storage medium storing machine-readable instructions according to some examples.

FIG. 6 is a flow diagram of a process according to some examples.

Figure 1:
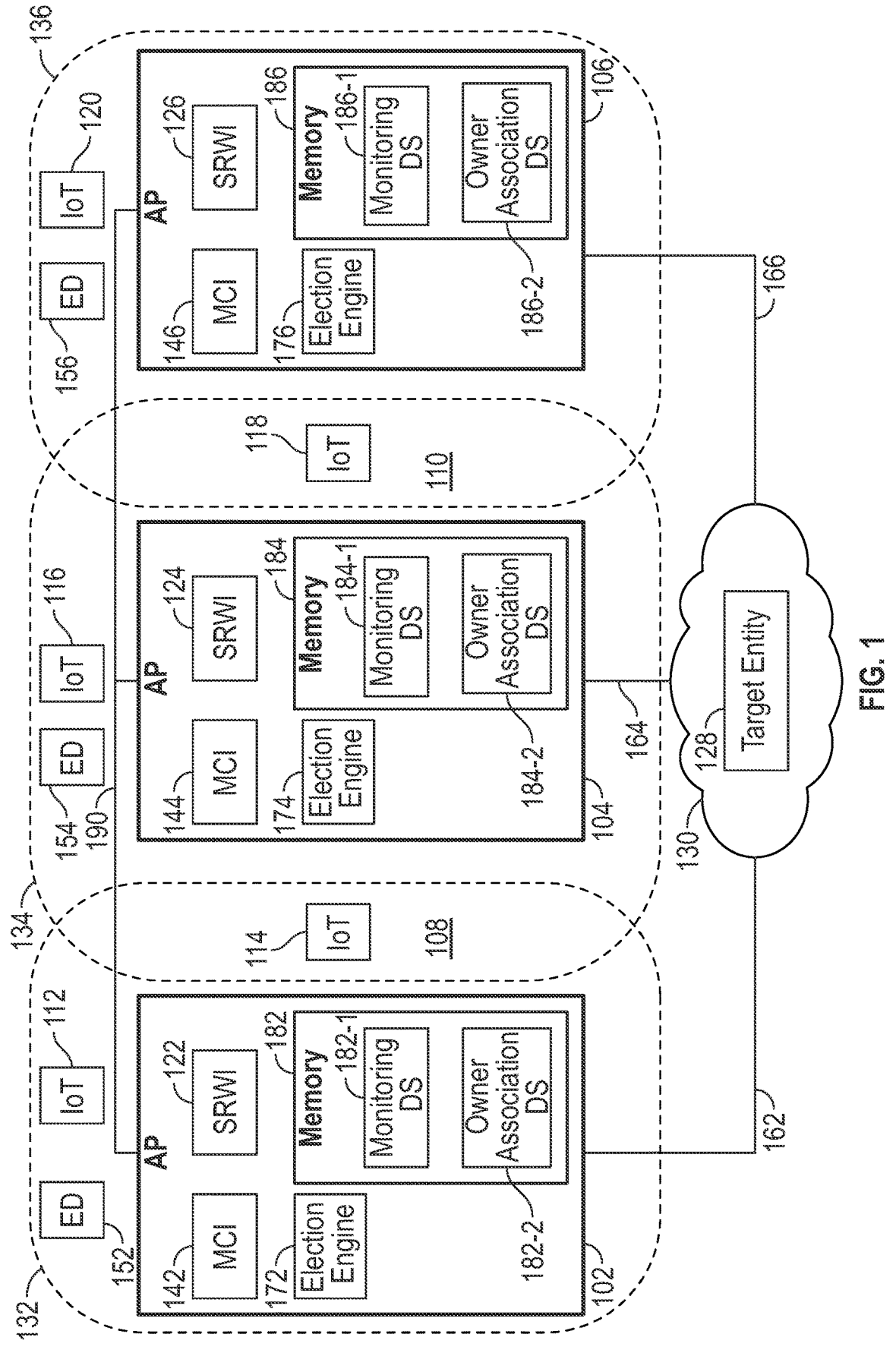
FIG. 1 is a block diagram of an arrangement including IoT devices and network devices, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Dedicated functionality devices can wirelessly couple to network devices of networks over wireless links. Examples of network devices include access points (APs), base stations, or other network devices that provide access to a network. A dedicated functionality device can send, through a wireless link, data that is to be transmitted to a target entity, which can be a program or machine in a cloud, at a data center, or at any other location. In some cases, the wireless coupling of dedicated functionality devices to network devices can be over short-range wireless links to short-range wireless interfaces of the network devices. An example of a short-range wireless interface is a Bluetooth Low Energy (BLE) interface. Other examples of short-range wireless interfaces include Radio Frequency Identification (RFID) interfaces, near field communication (NFC) interfaces, Zigbee interfaces, infrared interfaces, or other wireless interfaces with ranges that are less than some specified threshold distance.

If a dedicated functionality device is at a location that is in the range of short-range wireless interfaces of multiple network devices, then each of the multiple network devices may transmit data of the dedicated functionality device to a target entity. The data of the dedicated functionality device transmitted from the multiple network devices are redundant and can lead to errors at the target entity or can cause a storage overload condition and/or a processing overload condition at the target entity. Also, sending redundant data of a large quantity of dedicated functionality devices can overburden network resources of a network between the network devices and the target entity.

In accordance with some implementations of the present disclosure, an election process may be performed among multiple network devices that have detected a given dedicated functionality device to elect one of the multiple network devices as an "owner" network device for the given dedicated functionality device. The owner network device is the network device tasked with transmitting data of the given dedicated functionality device to a target entity. Any other network device that has not been elected as an owner network device of the given dedicated functionality device does not transmit the data of the given dedicated functionality device to the target entity. In this way, data of the given dedicated functionality device is not redundantly sent to the target entity by the multiple network devices.

A network device includes a short-range wireless interface and a communication interface that is separate from the short-range wireless interface. The communication interface is the "main" communication interface through which electronic devices can associate with the network device so that the electronic devices are able to communicate over a network. In some examples in which the main communication interface is a wireless interface, a short-range wireless interface is a wireless interface that has a restricted range as compared to the main communication interface of the network device.

An association between an electronic device and the network device refers to an establishment of a connection between the electronic device and the network device, such as based on association procedures, so that the electronic device is able to communicate over the network with other devices. For example, an association procedure can include a Wi-Fi association procedure between the electronic device and an AP of a Wi-Fi network (also referred to as a wireless local area network or WLAN). As another example, an association procedure can include a cellular connection procedure between the electronic device and a cellular base station. In a further example, an association procedure can be performed over a wired network, such as to establish an Ethernet connection over an Ethernet network. More generally, an "association procedure" refers to any procedure to establish a connection that involves identifying an electronic device and authenticating the electronic device. The connection established between an electronic device and the main communication interface of the network device is over a "network wireless link," which is distinct from a short-range wireless link that can be established between an electronic device and the short-range wireless interface of the network device.

A dedicated functionality device can couple to the network device over a short-range wireless link with the short-range wireless interface of the network interface, but the dedicated functionality device may not have an interface to connect to the main communication interface of the network device. The dedicated functionality device that wirelessly couples to the short-range wireless interface of the network device is not able to access a network that would be accessible if an association were established with the main communication interface of the network device.

FIG. 1 is a block diagram of an example arrangement that includes APs 102, 104, and 106. Various IoT devices 112, 114, 116, 118, and 120 are able to establish short-range wireless links with short-range wireless interfaces of the APs 102, 104, and 106. Although specific numbers of APs and IoT devices are shown in FIG. 1, in other examples, a different number of APs and IoT devices may be present. Also, in other examples, other types of network devices different from APs can be used to communicate with IoT devices or other types of dedicated functionality devices. Examples of dedicated functionality devices include sensors, cameras, thermostats, light fixtures, security devices, home appliances, or other types of devices.

The AP 102 includes a short-range wireless interface (SRWI) 122 that can establish short-range wireless links with the IoT devices 112 and 114 within a coverage area 132 of the short-range wireless interface 122.

A "wireless interface" can include a transceiver to transmit and receive wireless signals. A wireless interface can also include any protocol layers to support protocols used for communicating information over the wireless link.

A "coverage area" of a wireless interface refers to a physical region that is within a range of the transceiver of the wireless interface. A device in the physical region is able to send signals to or receive signals from the wireless interface.

The AP 104 includes a short-range wireless interface 124 that can establish short-range wireless links with IoT devices 114, 116, and 118 that are within a coverage area 134 of the short-range wireless interface 122. The AP 106 includes a short-range wireless interface 126 that can establish short-range wireless links with IoT devices 118 and 120 that are within a coverage area 136 of the short-range wireless interface 126.

Examples of the short-range wireless interfaces 122, 124, and 126 can include any or some combination of the following: BLE interfaces, RFID interfaces, NFC interfaces, Zigbee interfaces, infrared interfaces, or other types of wireless interfaces.

The APs 102, 104, and 106 further include respective main communication interfaces (MCIs) 142, 144, and 146. Examples of the main communication interfaces 142, 144, and 146 include main wireless interfaces, such as Wi-Fi interfaces, cellular interfaces, or other types of wireless interfaces. The coverage area of a main wireless interface in an AP may be different from a coverage area of a short-range wireless interface in the AP.

In other examples, the main communication interfaces 142, 144, and 146 may establish wired connections with respective electronic devices.

In the ensuing discussion, it is assumed that the main communication interfaces 142, 144, and 146 are wireless interfaces. The main communication interface 142 can establish a network wireless link with an electronic device (ED) 152 within a coverage area of the main communication interface 142, the main communication interface 144 of the AP 104 can establish a network wireless link with an electronic device 154 within a coverage area of the main communication interface 144, and the main communication interface 146 of the AP 106 can establish a network wireless link with an electronic device 156 within a coverage area of the main communication interface 146. Examples of the electronic devices 152, 154, and 156 can include any or some combination of the following: a desktop computer, a notebook computer, a tablet computer, a smartphone, a game appliance, a vehicle, a household appliance, a communication node, a storage system, or any other type of electronic device.

In some examples, it is assumed that one or more of the IoT devices 112, 114, 116, 118, and 120 are without interfaces to communicate with a main communication interface of any AP.

As depicted in FIG. 1, the coverage areas 132, 134, and 136 of the respective short-range wireless interfaces 122, 124, and 126 may overlap. For example, the coverage areas 132 and 134 of the respective short-range wireless interfaces 122 and 124 can have an overlapping region 108, and the coverage areas 134 and 136 of the respective short-range wireless interfaces 124 and 126 can have an overlapping region 110. Any IoT device in an overlapping region can communicate with multiple APs. For example, the IoT device 114 in the overlapping region 108 can establish short-range wireless links with both the APs 102 and 104, and the IoT device 118 in the overlapping region 110 can establish short-range wireless links with both the APs 104 and 106. In further examples, it is possible that coverage areas of short-range wireless interfaces of more than two APs may overlap, in which case any IoT device in such an overlapping region can establish short-range wireless links with more than two APs.

An IoT device can send data (e.g., sensor data, image or video data, or any other type of data collected or generated by the IoT device) over a short-range wireless link to an AP. In the example, each of the IoT devices 114 and 118 can send data to multiple APs over respective short-range wireless links. The IoT device 114 can send data to the APs 102 and 104, and the IoT device 118 can send data to the APs 104 and 106. The data from IoT devices are transmitted by APs to a target entity 128 that can be at a specified location 130, such as a cloud computing environment, a data center, a home, an office location, a retail location, or any other location. The target entity 128 can include a program or a machine.

The target entity 128 is coupled over respective links 162, 164, and 166 to the APs 102, 104, and 106. In some examples, the links 162, 164, and 166 are wired links. In other examples, the links 162, 164, and 166 can include wireless links. For example, the links 162, 164, and 166 may be part of a network, such as a local area network (LAN), a wide area network (WAN), a public network such as the Internet, or any other type of network.

It is possible that data from the IoT device 114 in the overlapping region 108 may be received by the APs 102 and 104 and transmitted by both APs 102 and 104 to the target entity 128, which would result in redundant data of the IoT device 114 being received by the target entity 128. Similarly, data of the IoT device 118 in the overlapping region 110 may be received by the APs 104 and 106 and transmitted by both the APs 104 and 106 to the target entity 128. The receipt of redundant data may lead to increased usage of processing and storage resources of the target entity 128, and in some cases may lead to errors at the target entity 128.

In accordance with some implementations of the present disclosure, rather than multiple APs sending data of a given IoT device to the target entity 128, the multiple APs can elect one of the APs as an "owner" AP of the given IoT device. The owner AP is the AP tasked for transmitting data of the given IoT device to the target entity 128. Any other AP that has not been elected as an owner AP of the given IoT device does not transmit the data of the given IoT device to the target entity 128. In this way, data of the given IoT device is not redundantly sent to the target entity 128 by multiple APs.

The election of an owner AP is based on performance of an election process by election engines 172, 174, and 176 in the respective APs 102, 104, and 106. As used here, an "engine" can refer to one or more hardware processing circuits (such as in a respective AP or another network device), which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

In an example, the election engines 172 and 174 can elect one of the APs 102 and 104 as the owner AP of the IoT device 114 that is located in the overlapping region 108. Similarly, the election engines 174 and 176 can elect one of the APs 104 and 106 as the owner AP of the IoT device 118 that is in the overlapping region 110. More generally, it is possible for multiple (two or more) election engines in respective APs to select one of the APs as the owner AP of any given IoT device.

The election of an owner AP from among the multiple APs can be based on election information exchanged among the election engines, such as over a network 190 connecting the APs 102, 104, and 106. The network 190 may be a wired network, such as an Ethernet network or another type of wired network. Alternatively, the network 190 may be a wireless network.

The election information that can be used to elect an owner AP from among multiple owner APs can include any or some combination of the following: an indicator of a signal strength, a scan time indicating a time duration since an AP detected an IoT device, a network address of an AP, or any other type of information indicative of which AP is preferred over other AP(s) among the multiple APs. The election information can also include an identifier of the IoT device that the election information is associated with. An identifier of a device can include a network address of the device, a serial number of the device, or any other identifier that can distinguish the device from another device.

An example of an indicator of signal strength is a Received Signal Strength Indicator (RSSI), which indicates a strength of a signal from a first device (e.g., an IoT device) as detected by a second device (e.g., an AP). In other examples, other types of indicators of signal strength may be employed, such as a signal to noise ratio (SNR), a measured decibel milliwatt (dBm), a measured power, or any other signal strength indication. In an example election process involving multiple APs, the multiple APs can exchange respective RSSIs indicating signal strengths of signals of a given IoT device as detected by the multiple APs. For example, in an election process to elect an owner AP of the IoT device 114, the election engine 172 in the AP 102 may send a first RSSI to the election engine 174 in the AP 104, where the first RSSI indicates a strength of a signal from the IoT device 114 as detected by the AP 102. Similarly, the election engine 174 in the AP 104 may send a second RSSI to the election engine 172 in the AP 102, where the second RSSI indicates a strength of a signal from the IoT device 114 as detected by the AP 104. Each of the election engines 172 and 174 can compare the first RSSI and the second RSSI. The election engines 172 and 174 can elect the AP 102 or 104 as the owner AP of the IoT device 114 depending on which of the first RSSI and the second RSSI indicates a higher signal strength. The election process favors electing the AP that has detected the higher signal strength of signals from the IoT device 114 as the owner AP.

Signal strengths of signals communicated between devices can be dependent upon a distance between the devices, presence of any signal interference obstacles between the devices, and possibly other factors. For example, if an IoT device is closer to a first AP than a second AP, then signals transmitted by the IoT device would have greater strength when detected by the first AP than by the second AP. Presence of a signal interference obstacle between an IoT device and an AP tends to reduce the strength of the IoT device's signals as detected by the AP.

As noted above, an election process to elect an owner AP from multiple APs may also consider a scan time, which is based on a time duration since an AP detected an IoT device. A first AP may have detected a given IoT device at time T1, and a second AP may have detected the given IoT device at time T2. The scan time measured at the first AP for the given IoT device is Tc–T1, where Tc represents a current time (e.g., the time at which the election process is performed). Similarly, the scan time measured at the second AP for the given IoT device is Tc–T2. From among the first AP and the second AP, the election process may favor electing the AP that has measured a longer scan time for the given IoT device as the owner AP of the given IoT device. The election engines in the first and second APs may exchange the respective first and second scan times with one another, and the election engine in each AP can compare the first and second scan times. The election engine elects the AP that has measured the longer scan time as the owner AP of the given IoT device.

In other examples, an election process may elect the AP with a shorter scan time as the owner AP of the given IoT device.

As noted above, an election process to elect an owner AP from multiple APs may also consider the network addresses of the multiple APs. Examples of network addresses include Media Access Control (MAC) addresses or Internet Protocol (IP) addresses. The election process may compare the network addresses of multiple APs and elect an AP that has a lowest (or highest) network address as the owner AP of a given IoT device.

In some examples, when the election process considers multiple factors in deciding which of multiple APs to elect as the owner AP of a given IoT device, the election process may first base the decision on a first factor (e.g., indicators of signal strength). If the first factor produces a tie from among plural APs, the election process then bases a decision of the owner AP on a second factor (e.g., scan times). A first indicator of signal strength as detected at a first AP is "equal" to a second indicator of signal strength as detected as a second AP if the indicated signal strengths are within a specified threshold tolerance of one another (e.g., with 0.5% of one another, within 1% of one another, within 2% of one another, or more generally, within X % of one another, where X is a real number that is greater than or equal to zero). The first indicator of signal strength being equal to the second indicator of signal strength produces a tie between the first and second APs in the election process.

When considering the second factor (e.g., scan times), the election process produces a tie between the first and second APs if a first scan time detected by the first AP is "equal" to a second scan time detected by the second AP. The first scan time is equal to the second scan time if the first and second scan times are within a specified threshold tolerance of one another.

If the second factor (e.g., scan times) also produces a tie among plural APs, the election process then bases a decision of the owner AP on a third factor (e.g., network addresses). The election process iteratively progresses through any additional factor when a tie results from use of a prior factor.

Each of the APs 102, 104, and 106 includes a respective memory, which can be implemented using one or more memory devices, such as any or some combination of the following: a dynamic random access memory (DRAM) device, a static random access memory (SRAM) device, a flash memory device, or any other type of memory device.

The AP 102 includes a memory 182, the AP 104 includes a memory 184, and the AP 106 includes a memory 186.

An election engine can store information in a respective memory for use in electing an owner AP for an IoT device. In the example of FIG. 1, the election engine 172 uses a monitoring data structure (DS) 182-1 and an owner association data structure 182-2 stored in the memory 182, the election engine 174 uses a monitoring data structure 184-1 and an owner association data structure 184-2 stored in the memory 184, and the election engine 176 uses a monitoring data structure 186-1 and an owner association data structure 186-2 stored in the memory 186. An example of a data structure can be a table, a file, or any other object that can contain information. Note that although the monitoring data structure and the owner association data structure are depicted as separate data structures, the monitoring data structure and the owner association data structure may represent a single data structure (e.g., a single table, a single file, a single object, etc.).

A monitoring data structure stored in a memory of an AP includes information of IoT devices detected by the AP. For example, IoT devices can transmit beacons, such as BLE beacons. A "beacon" refers to a message, a signal, or any other type of information that is transmitted by a device for detection by another device. A beacon is transmitted by a short-range wireless interface of the IoT device, which can be detected at the short-range wireless interface of an AP. When an IoT device comes within range of the short-range wireless interface of an AP and the AP detects the beacon transmitted by the IoT device, the AP adds information of the IoT device (such as an identifier of the IoT device) to the monitoring data structure.

An owner association data structure stored in a memory of an AP includes information of any IoT device (e.g., an identifier of the IoT device) for which the AP has been designated as the owner AP, such as when elected in an election process involving multiple APs, or when designated as the owner AP in other scenarios.

Figure 2:
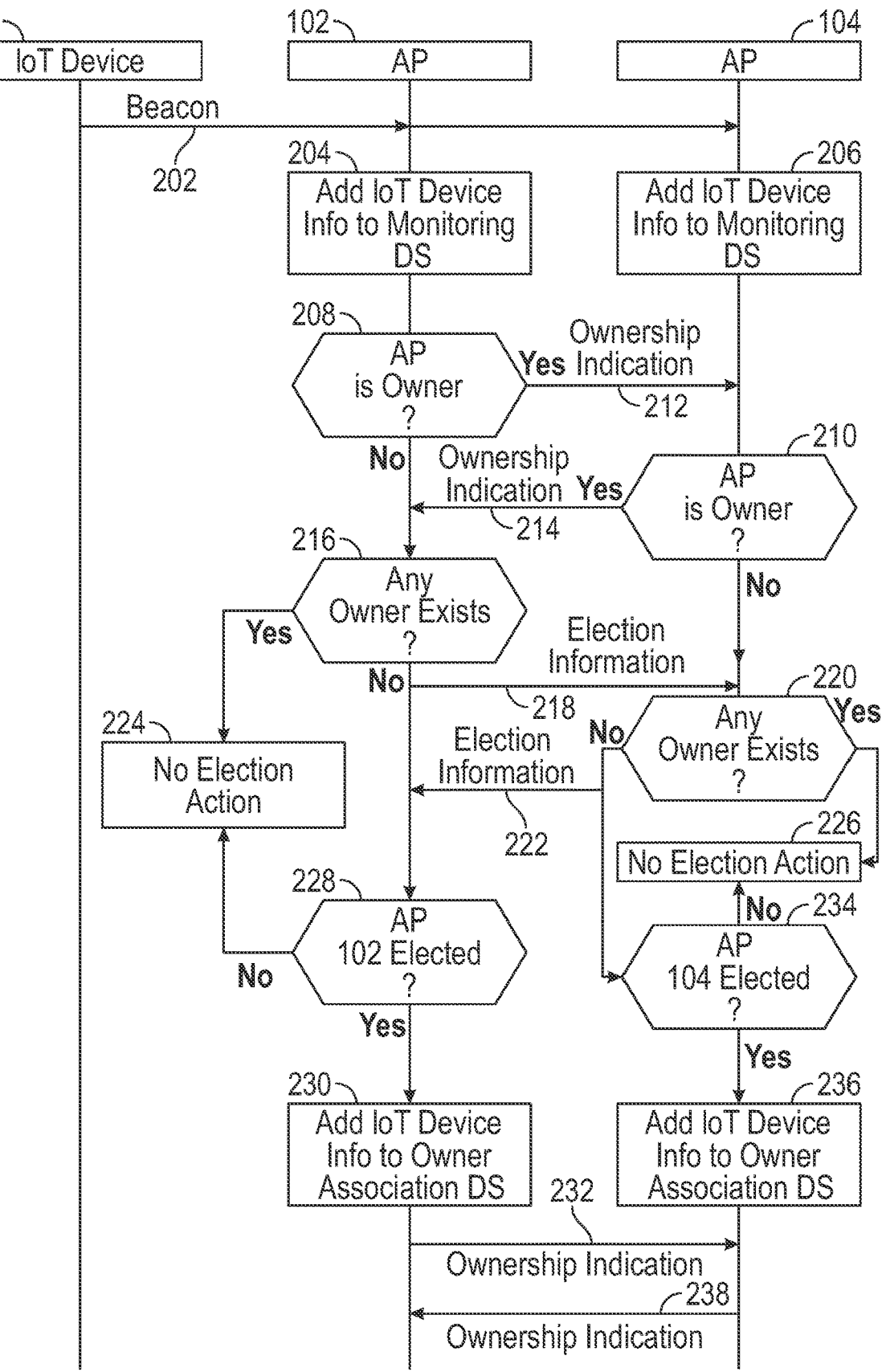
FIG. 2 and FIG. 3 are flow diagrams of processes performed by various entities according to some examples.

FIG. 2 is a flow diagram of a process involving various entities, including the IoT device 114 and APs 102 and 104. The IoT device 114 may be located in the overlapping region 108 (FIG. 1) of coverage areas of the respective APs 102 and 104.

The IoT device 114 transmits (at 202) a beacon, which can be performed on a periodic basis or an intermittent basis. In response to detecting the beacon from the IoT device 114, the AP 102 adds (at 204) information (including an identifier, for example) of the IoT device 114 to the monitoring data structure 182-1 in the memory 182 of the AP 102 (assuming that the information of the IoT device 114 is not already in the monitoring data structure 182-1). Similarly, in response to detecting the beacon from the IoT device 114, the AP 104 adds (at 206) information (including an identifier, for example) of the IoT device 114 to the monitoring data structure 184-1 in the memory 184 of the AP 104 (assuming that the information of the IoT device 114 is not already in the monitoring data structure 184-1).

The AP 102 checks (at 208) its owner association data structure 182-2 (stored in the memory 182 of the AP 102) to determine whether the AP 102 is an owner AP for the IoT device 114. Similarly, the AP 104 checks (at 210) its owner association data structure 184-2 (stored in the memory 182 of the AP 104) to determine whether the AP 104 is an owner AP for the IoT device 114. If the owner association data structure 182-2 indicates that the AP 102 is the owner AP of the IoT device 114, the AP 102 broadcasts (at 212) an ownership indication (e.g., a message, an information element, a signal, or any other information) for the IoT device 114 to other APs (including the AP 104), such as over the network 190. The ownership indication indicates that the AP 102 is the owner AP of the IoT device 114. For example, the ownership indication can include an identifier of the IoT device 114 and a status flag set to a value to indicate that the IoT device 114 is owned by the AP that sent the ownership indication. In response to receiving the ownership indication for the IoT device 114 from the AP 102, the AP 104 makes a determination not to send election information for an election process to select an owner AP of the IoT device 114, since the AP 102 has indicated that the AP 102 is the owner AP of the IoT device 114.

If the owner association data structure 184-2 indicates that the AP 104 is the owner AP of the IoT device 114, the AP 104 broadcasts (at 214) an ownership indication for the IoT device 114 to other APs (including the AP 102). The ownership indication sent by the AP 104 indicates that the AP 104 is the owner AP of the IoT device 114. In response to receiving the ownership indication for the IoT device 114 from the AP 104, the AP 102 makes a determination not to send election information for an election process to select an owner AP of the IoT device 114, since the AP 104 has indicated that the AP 104 is the owner AP of the IoT device 114.

The election engine 172 in the AP 102 determines (at 216) if there is currently any owner AP of the IoT device 114. The election engine 172 determines there is currently no owner AP of the IoT device 114 based on the owner association data structure 182-2 not indicating that the AP 102 is the owner AP of the IoT device 114 and if the AP 102 has not received any ownership indication for the IoT device 114 from any other AP. If the election engine 172 determines (at 216) there is currently no owner AP of the IoT device 114, the election engine 172 broadcasts (at 218) election information to other APs (including the AP 104) as part of an election process for the IoT device 114.

If the election engine 172 determines (at 216) there is currently an owner AP of the IoT device 114, the election engine 172 takes no election action (at 224); in other words, the election engine 172 does not perform an election process for the IoT device 114.

Similarly, the election engine 174 in the AP 104 determines (at 220) if there is currently any owner AP of the IoT device 114. The election engine 174 determines there is currently no owner AP of the IoT device 114 based on the owner association data structure 184-2 not indicating that the AP 104 is the owner AP of the IoT device 114 and if the AP 104 has not received any ownership indication for the IoT device 114 from any other AP. If the election engine 174 determines (at 220) there is currently no owner AP of the IoT device 114, the election engine 174 broadcasts (at 222) election information to other APs (including the AP 102) as part of the election process for the IoT device 114.

If the election engine 174 determines (at 220) there is currently an owner AP of the IoT device 114, the election engine 174 takes no election action (at 226); in other words, the election engine 174 does not perform an election process for the IoT device 114.

Based on the election information (e.g., including an indicator of signal strength, a scan time, a network address, etc.) generated at the AP 102 and the election information received from other AP(s), the election engine 172 determines (at 228) if the AP 102 should be elected the owner AP of the IoT device 114. If so, the election engine 172 adds (at 230) information of the IoT device 114 to the ownership association data structure 182-2, and broadcasts (at 232) an ownership indication for the IoT device 114 to other APs (including the AP 104).

If the election engine 172 determines (at 228) that the AP 102 should not be the owner AP, the election engine 172 takes no further election action (at 224) for the IoT device 114. Note that if the monitoring data structure 182-1 contains an entry for the IoT device 114 but the owner association data structure 182-2 does not contain an entry for the IoT device 114, that can indicate to the AP 102 that the AP 102 is not the owner AP of the IoT device 114. This can easily be confirmed by the AP 102 by querying the monitoring data structure 182-1 and the owner association data structure 182-2 to find entries (if any) for the IoT device 114.

Based on the election information generated at the AP 104 and the election information received from other AP(s), the election engine 174 determines (at 234) if the AP 102 should be elected the owner AP of the IoT device 114. If so, the election engine 174 adds (at 236) information of the IoT device 114 to the ownership association data structure 184-2, and broadcasts (at 238) an ownership indication for the IoT device 114 to other APs (including the AP 102). If the election engine 174 determines (at 234) that the AP 104 should not be the owner AP, the election engine 174 takes no further election action (at 226) for the IoT device 114.

When an AP (the "receiving AP") receives election information for a given IoT device from another AP, the receiving AP can check the monitoring data structure of the receiving AP to determine whether the receiving AP has previously detected the given IoT device. If the monitoring data structure of the receiving AP does not contain an entry including information for the given IoT device, the receiving AP makes a determination that the receiving AP should not participate in the election process for the given IoT device. However, if the monitoring data structure of the receiving AP contains an entry including information for the given IoT device, the receiving AP makes a determination that the receiving AP should participate in the election process for the given IoT device, and can transmit election information for the given IoT device to the other APs.

When a particular AP detects a given IoT device, the particular AP adds an entry including information for the given IoT device to the monitoring data structure of the particular AP. The particular AP also waits to determine whether election information for the given IoT device is received from any other AP. If the particular AP does not receive election information for the given IoT device from any other AP after a specified threshold duration (e.g., 10 seconds or any other duration), the particular AP can make a determination that the particular AP should be the owner AP of the given IoT device, and adds an entry for the given IoT device to the ownership association data structure of the particular AP. The particular AP not receiving election information from any other AP can indicate that the given IoT device is within range of the particular AP but not of any other AP. As a result, the particular AP can be designated as the owner AP of the given IoT device without performing an election process.

In some cases, it may be possible for the election engines in multiple APs to elect multiple owner APs for a given IoT device. For example, the election engine in a first AP may determine in the election process for the given IoT device that the first AP should be the owner AP of the given IoT device, and further, the election engine in a second AP may determine in the election process for the given IoT device that the second AP should be the owner AP of the given IoT device. The election of multiple owner APs for the given IoT device may be caused by data errors in reported election information, for example. As noted above, when the election engine elects an AP as the owner AP of the given IoT device, the election engine sends an ownership indication to other APs. If multiple owner APs of the given IoT device are elected, the multiple owner APs would transmit ownership indications for the given IoT device. In cases where multiple APs have been elected as owner APs, each of the multiple owner APs would continue to exchange election information (which may be updated as conditions change) with one another so that the multiple owner APs can perform further election process(es) for the given IoT device. The further election process(es) will result in the election of just one AP as the owner AP of the given IoT device. Note that the election of multiple owner APs for the given IoT device is considered an error condition, during which the multiple owner APs would not transmit data of the given IoT device to a target entity (e.g., 128 in FIG. 1).

An IoT device that has associated with one owner AP can be referred to as a "virtual IoT device." The term "virtual" is used to indicate that although the IoT device is potentially within range of multiple APs (and in fact may be sending data of the IoT device to the multiple APs), just one of the multiple APs (i.e., the owner AP) would forward the data of the IoT device to a target entity (e.g., 128 in FIG. 1).

In some cases, an IoT device may move to different locations. As a result, the location of the IoT device relative to APs may change, which may cause RSSIs for signals of the IoT device detected by the APs to change. When the election engine of an AP detects a change in an RSSI or any other factor included in election information by greater than a threshold amount (e.g., the RSSI has increased or decreased by X %, where X is a real number that is greater than zero), the election engine can send election information to other APs, which may trigger the other APs to send election information so that the APs can perform another election process. The election process may elect a different owner AP of the IoT device due to physical movement of the IoT device.

After a particular AP has been elected an owner AP of an IoT device, the particular AP may become unavailable, such as due to a fault of the particular AP or due to loss of network connectivity to the particular AP. If the owner AP were to become unavailable, then another AP will have to take over as a new owner AP to send data of the IoT device. In some examples, the APs can implement a failover mechanism that involves a transmission of keep-alive messages. As long as an AP is operational, the AP continues to transmit keep-alive messages, such as periodically or at other intervals. A "keep-alive message" can refer to any message or other information used to indicate an availability of an entity that transmitted the keep-alive message.

Figure 3:
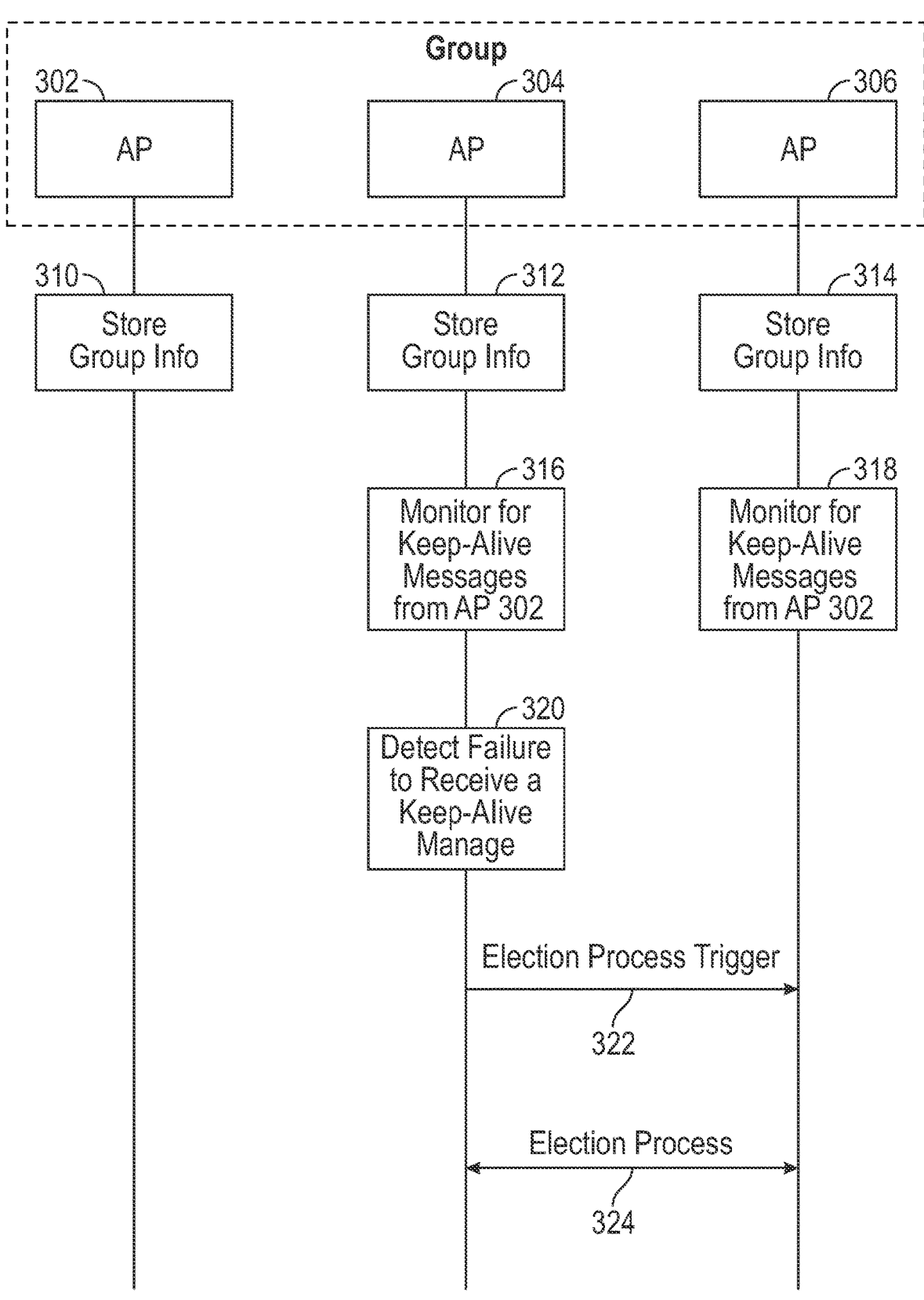

APs of a group of APs that were involved in an election process may monitor keep-alive messages of other APs of the group. For example, as shown in FIG. 3, the APs 302, 304, 306 of the group may respectively store (at 310, 312, 314) group information of which APs are members of the group that participated in the election process. Assuming that the first AP 302 of the group was elected the owner AP of an IoT device, the other APs (including the second AP 304 and the third AP 306, for example) of the group would monitor (at 316, 318) for keep-alive messages of the first AP 302. If another AP (e.g., 304) of the group detects (at 320) a failure to receive a keep-alive message from the first AP 302 for longer than a specified time duration, the AP 304 can send (at 322) an election process trigger (e.g., a message, an information element, etc.) to cause the remaining APs of the group to perform (at 324) another election process to elect a new owner AP to take over transmission of data of the IoT device to a target entity. The election process involves exchanging election information among the remaining APs to elect the new owner AP for the IoT device.

FIG. 4 is a block diagram of a first network device 400 in accordance with some examples of the present disclosure. The first network device 400 can be an AP or another type of network device.

The first network device 400 includes an association communication interface 402 to associate with electronic devices using association procedures. The association communication interface 402 may be a Wi-Fi interface, a cellular interface, or another type of a main communication interface.

The first network device 400 further includes a short-range wireless interface 404 to wirelessly receive data from an electronic device over a wireless link distinct from any communication link to the communication interface 402. The electronic device may be an IoT device, for example.

The first network device 400 further includes at least one hardware processor 406 to perform various tasks, such as under control of machine-readable instructions executed by the at least one hardware processor 406. A hardware processor can include a microprocessor, a core of a multi-core microprocessor, a microcontroller, a programmable integrated circuit, a programmable gate array, or another hardware processing circuit.

The tasks of the at least one hardware processor 406 include a first election information determination task 408 to determine first election information relating to a wireless communication through the short-range wireless interface 404 between the electronic device and the first network device 400. The determined first election information can include an RSSI of signals from the electronic device, a scan time for the electronic device, and/or a network address of the first network device 400, for example.

The tasks of the at least one hardware processor 406 include a second election information reception task 410 to receive, at the first network device over a network from a second network device, second election information relating to a wireless communication between the electronic device and the second network device.

The tasks of the at least one hardware processor 406 include an election task 412 to, based on the first election information and the second election information, perform an election process that determines whether the first network device 400 is elected, from among a plurality of network devices including the first network device 400 and the second network device, to send the data of the electronic device received through the short-range wireless interface 404 to a target entity.

In some examples, the first election information includes a first indicator of a signal strength of the wireless communication between the electronic device and the first network device 400, and the second election information includes a second indicator of a signal strength of the wireless communication between the electronic device and the second network device. The election process is based on a comparison of the first indicator and the second indicator.

In some examples, the election process selects the first network device 400 over the second network device based on the first indicator indicating a greater signal strength than the second indicator.

In some examples, the first election information includes a first scan time indicating a time duration since the first network device 400 detected the electronic device, and the second election information includes a second scan time indicating a time duration since the second network device detected the electronic device. The election process is based on a comparison of the first scan time and the second scan time.

In some examples, the election process selects the first network device 400 over the second network device based on the first scan time being greater (or less) than the second scan time.

In some examples, the at least one hardware processor 406 performs the election process based on the comparison of the first scan time and the second scan time responsive to a determination that a signal strength of the wireless communication between the electronic device and the first network device 400 is equal (within a specified threshold tolerance) to a signal strength of the wireless communication between the electronic device and the second network device.

In some examples, the first election information includes a first network address of the first network device 400, and the second election information includes a second network address of the second network device. The election process is based on a comparison of the first network address and the second network address.

In some examples, the at least one hardware processor 406 performs the election process based on the comparison of the first network address and the second network address responsive to a determination that a signal strength of the wireless communication between the electronic device and the first network device 400 is equal (within a specified threshold tolerance) to a signal strength of the wireless communication between the electronic device and the second network device.

In some examples, the election of the first network device 400 causes the second network device to not transmit the data of the electronic device to the target entity.

In some examples, the election process elected the second network device to transmit the data of the electronic device. The at least one hardware processor 406 detects an unavailability of the second network device, such as based on detecting a failure to receive a keep-alive message from the second network device for longer than a specified time duration. Based on detecting the unavailability of the second network device, the at least one hardware processor 406 initiates another election process to elect another network device from among the plurality of network devices to transmit the data of the electronic device to the target entity.

In some examples, the election process selects the first network device over the second network device based on first election information and the second election information, and the first network device 400 transmits, to the target entity, the data from the electronic device received through the wireless interface, in response to the election process selecting the first network device 400.

FIG. 5 is a block diagram of a non-transitory machine-readable or computer-readable storage medium 500 storing machine-readable instructions that upon execution cause a first network device to perform various tasks.

The machine-readable instructions include electronic device detection instructions 502 to detect an electronic device based on receiving, through a short-range wireless interface of the first network device, a beacon transmitted by the electronic device. The short-range wireless interface is distinct from a main communication interface of the first network device, and the first network device is to associate with electronic devices using association procedures through the main wireless interface. The first network device does not associate with the electronic device through the main communication interface.

The machine-readable instructions include first election information determination instructions 504 to, based on detecting the electronic device, determine first election information relating to a wireless communication through the short-range wireless interface between the electronic device and the first network device. The first election information is generated by the first network device based on measurements or other information of the first network device.

The machine-readable instructions include second election information reception instructions 506 to receive, at the first network device over a network from a second network device, second election information relating to a wireless communication between the electronic device and the second network device.

The machine-readable instructions include election instructions 508 to, based on the first election information and the second election information, perform an election process that elects the first network device, from among a plurality of network devices including the first network device and the second network device, as an owner network device of the electronic device.

The machine-readable instructions include data transmission instructions 510 to, based on the election process electing the first network device, send data of the electronic device received through the short-range wireless interface from the first network device to a target entity.

FIG. 6 is a flow diagram of a process 600 according to some examples. The process 600 includes receiving (at 602), at a first network device through a short-range wireless interface of the first network device, a beacon transmitted by an electronic device. Based on the beacon, the first network device adds (at 604) an identifier of the electronic device to a first data structure that tracks electronic devices detected by the first network device. The first data structure can be a monitoring data structure (e.g., 182-1, 184-1, or 186-1 in FIG. 1).

The first network device determines (at 606) first election information relating to a wireless communication through the short-range wireless interface between the electronic device and the first network device. The first network device receives (at 608), at the first network device over a network from a second network device, second election information relating to a wireless communication between the electronic device and the second network device.

Based on the first election information and the second election information, the first network device performs (at 610) an election process that elects the first network device as an owner network device of the electronic device, from among a plurality of network devices including the first network device and the second network device.

The first network device adds (at 612) an identifier of the electronic device to a second data structure that indicates that the first network device is the owner network device of the electronic device. The second data structure can be an owner association data structure (e.g., 182-2, 184-2, 186-2 in FIG. 1).

Based on the election process electing the first network device, the first network device sends (at 614) data of the electronic device received through the short-range wireless interface from the first network device to a target entity.

In some examples, the first network device queries the first data structure and the second data structure to determine whether the first network device is an owner network device of a second electronic device. Although referred to as first and second data structures, note that the first and second data structures may be part of the same data structure.

A storage medium (e.g., 500 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A first network device comprising:
   a communication interface to associate with electronic devices;
   a wireless interface to wirelessly receive data from an electronic device over a wireless link distinct from any communication link to the communication interface; and
   at least one processor to:
      determine first election information relating to a wireless communication through the wireless interface between the electronic device and the first network device,
      receive, at the first network device over a network from a second network device, second election information relating to a wireless communication between the electronic device and the second network device,
      based on the first election information and the second election information, perform an election process that determines whether the first network device is elected, from among a plurality of network devices including the first network device and the second network device, to send the data received through the wireless interface to a target entity.

2. The first network device of claim 1, wherein the wireless interface is a short-range wireless interface.

3. The first network device of claim 2, wherein the wireless interface is a Bluetooth interface.

4. The first network device of claim 2, wherein the communication interface is an association wireless interface with which the electronic devices associate using an association procedure.

5. The first network device of claim 4, wherein the association wireless interface is a Wi-Fi interface or a cellular interface.

6. The first network device of claim 1, wherein the first election information comprises a first indicator of a signal strength of the wireless communication between the electronic device and the first network device, and the second election information comprises a second indicator of a signal strength of the wireless communication between the electronic device and the second network device, and wherein the election process is based on a comparison of the first indicator and the second indicator.

7. The first network device of claim 6, wherein the election process selects the first network device over the second network device based on the first indicator indicating a greater signal strength than the second indicator.

8. The first network device of claim 1, wherein the first election information comprises a first scan time indicating a time duration since the first network device detected the electronic device, and the second election information comprises a second scan time indicating a time duration since the second network device detected the electronic device, and wherein the election process is based on a comparison of the first scan time and the second scan time.

9. The first network device of claim 8, wherein the election process selects the first network device over the second network device based on the first scan time being greater than the second scan time.

10. The first network device of claim 9, wherein the at least one processor is to perform the election process based on the comparison of the first scan time and the second scan time responsive to a determination that a signal strength of the wireless communication between the electronic device and the first network device is equal a signal strength of the wireless communication between the electronic device and the second network device.

11. The first network device of claim 1, wherein the first election information comprises a first network address of the first network device, and the second election information comprises a second network address of the second network device, and wherein the election process is based on a comparison of the first network address and the second network address.

12. The first network device of claim 11, wherein the at least one processor is to perform the election process based on the comparison of the first network address and the second network address responsive to a determination that a signal strength of the wireless communication between the electronic device and the first network device is equal a signal strength of the wireless communication between the electronic device and the second network device.

13. The first network device of claim 1, wherein the election of the first network device causes the second network device to not transmit the data of the electronic device to the target entity.

14. The first network device of claim 1, wherein the election process elected the second network device to transmit the data of the electronic device, and wherein the at least one processor is to:

detect an unavailability of the second network device, and based on detecting the unavailability of the second network device, initiate another election process to elect another network device from among the plurality of network devices to transmit the data of the electronic device to the target entity.

15. The first network device of claim 1, wherein the election process selects the first network device over the second network device based on first election information and the second election information, and wherein the at least one processor is to:

based on the election process selecting the first network device, transmit, to the target entity, the data from the electronic device received through the wireless interface.

16. A non-transitory machine-readable storage medium comprising instructions that upon execution cause a first network device to:

detect an electronic device based on receiving, through a short-range wireless interface of the first network device, a beacon transmitted by the electronic device;

based on detecting the electronic device, determine first election information relating to a wireless communication through the short-range wireless interface between the electronic device and the first network device;

receive, at the first network device over a network from a second network device, second election information relating to a wireless communication between the electronic device and the second network device;

based on the first election information and the second election information, perform an election process that elects the first network device, from among a plurality of network devices including the first network device and the second network device; and based on the election process electing the first network device, send data of the electronic device received through the short-range wireless interface from the first network device to a target entity.

17. The non-transitory machine-readable storage medium of claim 16, wherein the short-range wireless interface is distinct from a further wireless interface of the first network device, and wherein the first network device is to associate with electronic devices using association procedures through the further wireless interface.

18. The non-transitory machine-readable storage medium of claim 17, wherein the first network device does not associate with the electronic device through the further wireless interface.

19. A method comprising:

receiving, at a first network device through a short-range wireless interface of the first network device, a beacon transmitted by an electronic device;

based on the beacon, adding, by the first network device, an identifier of the electronic device to a first data structure that tracks electronic devices detected by the first network device;

determining, by the first network device, first election information relating to a wireless communication through the short-range wireless interface between the electronic device and the first network device;

receiving, at the first network device over a network from a second network device, second election information relating to a wireless communication between the electronic device and the second network device;

based on the first election information and the second election information, perform an election process that elects the first network device as an owner network device of the electronic device, from among a plurality of network devices including the first network device and the second network device;

adding, by the first network device, an identifier of the electronic device to a second data structure that indicates that the first network device is the owner network device of the electronic device; and based on the election process electing the first network device, sending, by the first network device, data of the electronic device received through the short-range wireless interface from the first network device to a target entity.

20. The method of claim 19, comprising:

querying, by the first network device accessing the first data structure and the second data structure, to determine whether the first network device is an owner network device of a second electronic device.

\* \* \* \* \*